United States Patent
Ringer et al.

(10) Patent No.: US 10,774,937 B2
(45) Date of Patent: Sep. 15, 2020

(54) COMBINATION CONTROL AND CHECK VALVE ASSEMBLY FOR A WET PIPING SYSTEM

(71) Applicant: Victaulic Company, Easton, PA (US)

(72) Inventors: Yoram Ringer, Providence, RI (US); Stephen J. Meyer, Chester Springs, PA (US); Gordon Farrell, North Conway, NH (US); Fang Huang, Xi'an Shaanxi (CN)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 16/239,807

(22) Filed: Jan. 4, 2019

(65) Prior Publication Data

US 2019/0301625 A1  Oct. 3, 2019

Related U.S. Application Data

(60) Provisional application No. 62/649,680, filed on Mar. 29, 2018.

(51) Int. Cl.
*F16K 15/18* (2006.01)
*F16K 27/00* (2006.01)
(Continued)

(52) U.S. Cl.
CPC .......... *F16K 15/183* (2013.01); *F16K 15/048* (2013.01); *F16K 27/00* (2013.01); *F16K 31/1635* (2013.01)

(58) Field of Classification Search
CPC .... F16K 15/183; F16K 15/048; F16K 15/188; F16K 15/18; F16K 39/045; F16K 39/06;
(Continued)

(56) References Cited

U.S. PATENT DOCUMENTS 2,151,098 A * 3/1939 Greenwood .......... F16K 15/188
137/269.5
3,363,650 A  1/1968 Scaramucci
(Continued)

FOREIGN PATENT DOCUMENTS

| EP | 1830009 A1 | 9/2007 |
| GB | 2157809 A | 10/1985 |
| WO | 2009020286 A1 | 2/2009 |

OTHER PUBLICATIONS

International Search Report and Written Opinion dated Apr. 1, 2019 in International Application No. PCT/US2019/012279.

*Primary Examiner* — Michael R Reid
(74) *Attorney, Agent, or Firm* — Panitch Schwarze Belisario & Nadel LLP

(57) ABSTRACT

A combination control and check valve assembly for a wet piping system includes a control valve in the form of a ball valve and a one-way check valve mounted within the flow pathway of the ball valve. A valve actuation assembly is mounted to the valve assembly to selectively rotate the ball valve between the open and closed positions thereof. The valve actuation assembly is mounted to a first side of the valve assembly and rotationally fixed to the ball, whereby rotation of the valve actuation assembly rotates the ball between the open and closed positions. A side opening is formed in a second side of the valve assembly that is angularly spaced from the first side. The side opening is positioned to align with the fluid flow pathway of the ball valve in the closed position thereof to provide access to the check valve.

10 Claims, 9 Drawing Sheets

(51) Int. Cl.
  *F16K 31/163* (2006.01)
  *F16K 15/04* (2006.01)
(58) Field of Classification Search
  CPC .................. F16K 31/163; F16K 27/12; Y10T 137/88022; Y10T 137/8803; Y10T 137/88038
  USPC ........................................ 137/614.16–614.18
  See application file for complete search history.

(56) References Cited

U.S. PATENT DOCUMENTS

| | | | |
|---|---|---|---|
| 3,474,818 A | | 10/1969 | Hartman |
| 3,707,161 A | * | 12/1972 | Crawford ............. F16K 5/0605 137/269 |
| 3,854,497 A | | 12/1974 | Rosenberg |
| 4,846,221 A | | 7/1989 | Kanemaru |
| 4,928,725 A | * | 5/1990 | Graves ................. F16K 5/0605 137/269.5 |
| 4,932,436 A | | 6/1990 | Kanemaru |
| 4,989,631 A | | 2/1991 | Harbin |
| 5,004,005 A | | 4/1991 | Graves |
| 5,137,259 A | | 8/1992 | Stein |
| 5,141,018 A | * | 8/1992 | Guterman ............. F16K 5/0657 137/375 |
| 5,373,868 A | | 12/1994 | Rodriguez |
| 5,551,749 A | | 9/1996 | Reher et al. |
| 6,098,659 A | | 8/2000 | Mannis |
| 2003/0062329 A1 | * | 4/2003 | Alley ................... B65D 47/263 215/307 |
| 2011/0062366 A1 | | 3/2011 | Thomas |
| 2015/0107708 A1 | | 4/2015 | Oltman et al. |
| 2018/0149275 A1 | | 5/2018 | Rizzio |

* cited by examiner

COMBINATION CONTROL AND CHECK VALVE ASSEMBLY FOR A WET PIPING SYSTEM

CROSS-REFERENCE TO RELATED APPLICATIONS

This application claims priority from U.S. Provisional Patent Application No. 62/649,680, titled "Wet Piping System Control Valve Assembly", filed on Mar. 29, 2018, the entire contents of which are incorporated by reference herein.

BACKGROUND OF THE DISCLOSURE

The present invention is generally directed to a fluid flow valve assembly, and, more particularly, to a valve assembly for a sprinkler wet standpipe used to monitor and control water released to downstream sprinklers of a fire suppression sprinkler system.

Fire suppression sprinkler systems designed for protection of commercial and non-commercial properties include some combination or all of a control valve, a check valve, a water flow detection switch, a test valve, a drain valve and a pressure relief valve. A control valve is utilized to allow water flow to the sprinklers downstream thereof to be selectively shut off, e.g., for maintenance purposes. A check valve permitting fluid flow therethrough in one direction but preventing fluid flow therethrough in an opposing direction retains fluid and pressure downstream in the fire protection system so that during periods such as supply side system maintenance, fluid and pressure are retained in the system downstream of the check valve. A flow detection switch is utilized at least to sound an alarm when the sprinklers are activated. A test valve is utilized for testing of the sprinkler system and a drain valve is utilized for draining the sprinkler system, e.g., also for maintenance related purposes. A pressure relief valve is utilized to ensure that the water pressure within the sprinkler system does not surpass a safe level.

These items are available individually from various commercial suppliers. Conventionally, the test and drain valves, the pressure relief valve and the water flow detection switch are mounted separately to respective conduits along a large manifold/network of piping proximate the control valve and/or check valve during installation of sprinkler systems. Consequently, the manifold of piping of the sprinkler system has a relatively large footprint, is costly to manufacture and is both time consuming, complicated and costly to assemble. As one example, the largest sprinkler system control valves (eight inches or more in diameter), in combination with the piping manifold, conduits and accessories mounted thereon, typically weigh several hundred pounds.

Moreover, in order to comply with certification and licensure requirements, automatic fire sprinkler systems are required to be periodically inspected and tested in accordance with the industry accepted standards set by the National Fire Protection Association ("NFPA"). One such inspection is an inspection of the check valve every five years, ensuring free movement of the moving valve component(s); inspecting the valve seat for damage which could permit water leakage and checking the overall internal health of the valve. Often the check valve must be removed in order to perform the inspection and/or for replacement. As the check valve is positioned in the water flow pathway, drainage of the entire system prior to testing becomes necessary, which is very cumbersome.

Moreover, dissolved oxygen, i.e., the volume of oxygen contained in water, is a corrosive agent, and the concentration of dissolved oxygen is directly proportional to the corrosion rate of metal. Oxygen enters water, in part, by the transfer of oxygen across the air-water interface. Therefore, draining the water within a sprinkler system, which has been exposed to less oxygen, in order to test the check valve and then re-introducing fresh water into the sprinkler system thereafter effectively replaces water having a lower dissolved oxygen concentration with water having a greater dissolved oxygen concentration, adding to the overall corrosion rate of internal components of the sprinkler system over time.

Therefore, it would be advantageous to manufacture a control valve assembly having a compact footprint, with the control valve and the check valve, the flow detection switch, the test valve, the drain valve and an adjustable pressure relief module, or some combination thereof, thereby eliminating the large manifold of piping and the associated footprint, as well as minimizing the cost and time of manufacture and complex assembly thereof. It would be further advantageous to manufacture such a control valve assembly with the ability to isolate and access the check valve in the water flow path, enabling inspection and/or maintenance thereof without requiring drainage of the entire system.

BRIEF SUMMARY OF THE DISCLOSURE

Briefly states, once aspect of the present disclosure is directed to a combination control and check valve assembly for a wet piping system. The valve assembly includes a valve body defining an inlet of the valve assembly, an outlet and a valve body fluid flow pathway therebetween. A ball valve is positioned within the valve body and includes a rotatable ball, an upstream sealing seat ring positioned on an inlet side of the ball and a downstream sealing seat ring positioned on a downstream side of the ball. The ball has an inlet opening, an outlet opening and a ball fluid flow pathway therebetween, and the upstream and downstream seat rings are configured to substantially seal off fluid flow between an upstream side and a downstream side of the ball except for travel through the ball fluid flow pathway. A valve actuation assembly configured to selectively rotate the ball between an open position, fluidly connecting the ball fluid flow pathway with the valve body fluid flow pathway to permit fluid flow from the inlet to the outlet of the valve body through the ball, and a closed position, substantially fluidly disconnecting the ball fluid flow path from the valve body fluid flow path to substantially prevent fluid flow from the inlet to the outlet of the valve body. The valve actuation assembly includes a stem extending from outside the valve body, through a first side thereof and into rotationally fixed attachment with the ball, whereby rotation of the stem rotates the ball between the open and closed positions thereof irrespective of a pressure differential across the ball. A one-way check valve is mounted within the ball and is movable according to a pressure differential across the check valve between a closed position, blocking fluid flow through the ball fluid flow pathway, and an open position, permitting fluid flow through the ball fluid flow pathway in a direction from the inlet side to the outlet side thereof. A side opening is formed in a second side of the valve body that is angularly spaced approximately 90° from the first side of the valve body.

The side opening is positioned to align with and access the ball fluid flow pathway in the closed position of the ball, and the side opening is dimensioned to permit passage of the check valve therethrough. A side cover removably closes the side opening.

BRIEF DESCRIPTION OF THE DRAWINGS

The following description of embodiments of the invention will be better understood when read in conjunction with the appended drawings. It should be understood, however, that the invention is not limited to the precise arrangements and instrumentalities shown. In the drawings.

DETAILED DESCRIPTION OF THE DISCLOSURE

Figure 1:
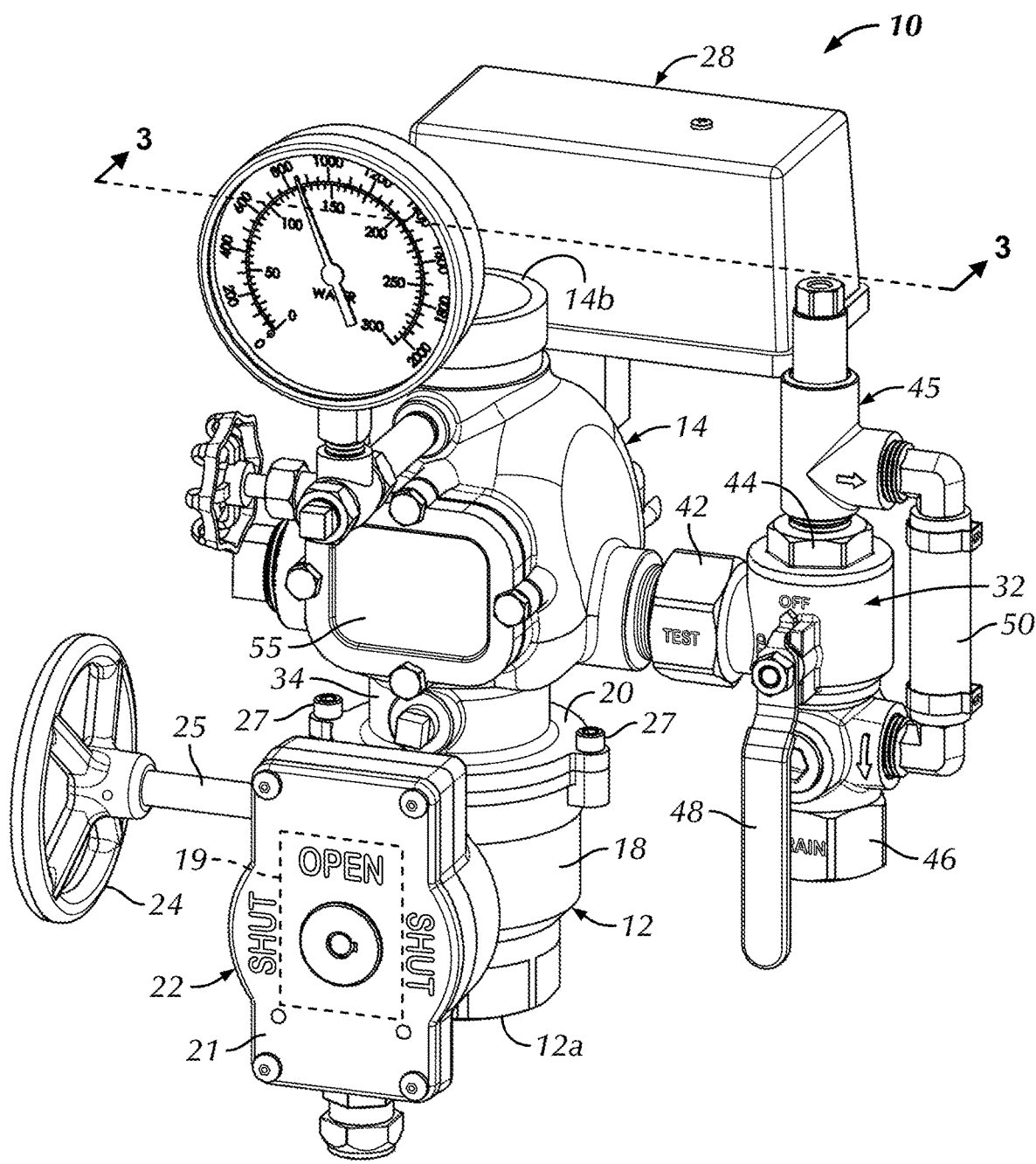
FIG. 1 is a perspective front and side view of a two piece modular control valve assembly according to a first embodiment of the present invention.
Figure 2:
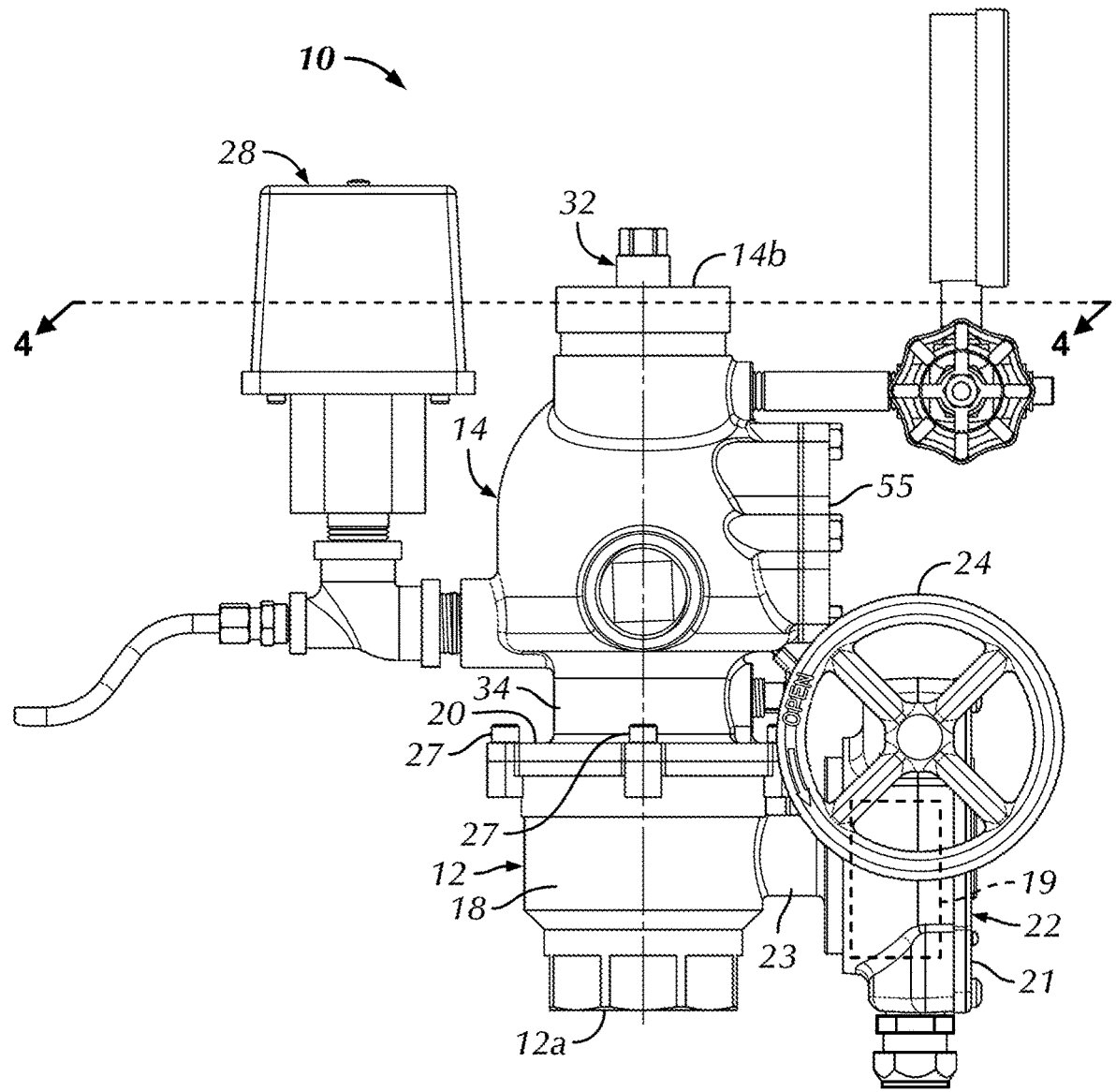
FIG. 2 is a side elevational view of the modular control valve assembly of FIG. 1.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the control valve assembly, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-4 a piping system control valve assembly ("CVA"), generally designated 10, in accordance with a first embodiment of the present invention. Generally, the CVA 10 is utilized in a wet standpipe (not shown) for a multi-floor property sprinkler system (not shown).

As should be understood by those of ordinary skill in the art, the wet standpipe extends generally vertically through the floors of the property, and a CVA 10 branches off of the standpipe at each of the respective floors. Each CVA 10 of a respective floor connects water in the standpipe with the sprinklers on that respective floor. The CVA 10 may also control draining of the sprinkler system for testing and maintenance, and where the CVA 10 includes a control valve (as described in detail further below), the CVA 10 may also control shutting off water flow to the sprinklers, e.g., at the end of a fire.

The CVA 10 includes two main components: an upstream control assembly 12 in series with a downstream check valve assembly 14, connected together in a manner described in detail further below. The control assembly 12 defines a main inlet 12a of the CVA 10 at a base end thereof (according to the orientation of the CVA 10 depicted in the Figs.) for receiving water from the wet standpipe, and the check valve assembly 14 defines a main outlet 14b of the CVA 10 at an uppermost end thereof (according to the same orientation of the CVA 10 depicted in the Figs.), through which water exits from the CVA 10 to the sprinklers (not shown). In one embodiment, both ends 12a, 14b may have respective outer peripheral grooves for mating in a conventional fashion with other fittings or pipe lengths. Alternatively, one or both of the ends 12a, 14b could be threaded (FIGS. 3, 4), flanged or the like for other types of conventional mating.

The control assembly 12 controls manual shut-off of the CVA 10 for maintenance purposes or to turn off sprinklers once a fire event is extinguished. As should be understood by those of ordinary skill in the art, aside from closing the CVA 10 for maintenance purposes the CVA 10 should generally be fully open at all times in order to ensure proper water flow to the sprinklers in the event of an emergency.

Figure 3:
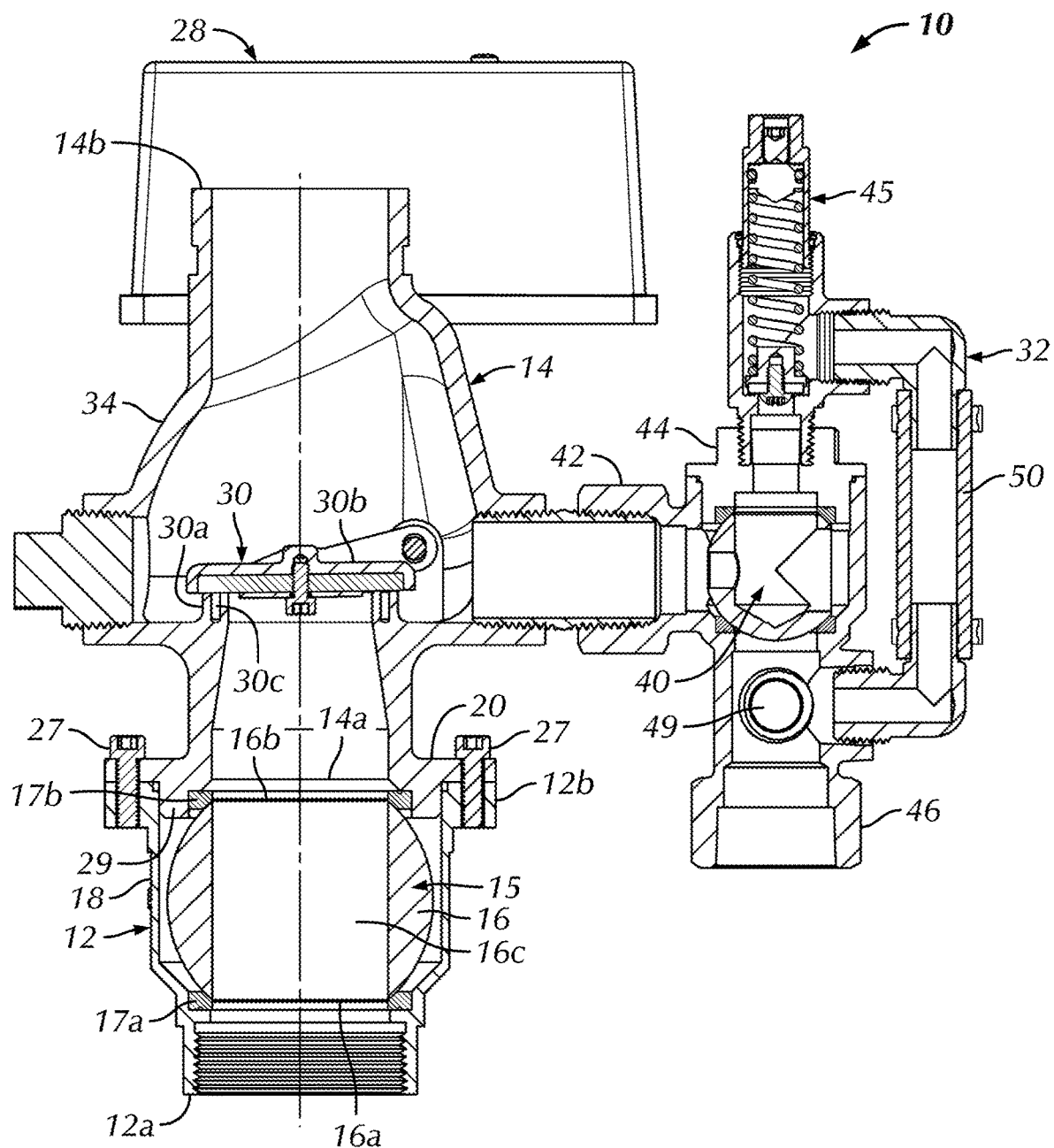
FIG. 3 is a cross-sectional view of the modular control valve assembly of FIG. 1, taken along the sectional line 3-3 of FIG. 1.
Figure 4:
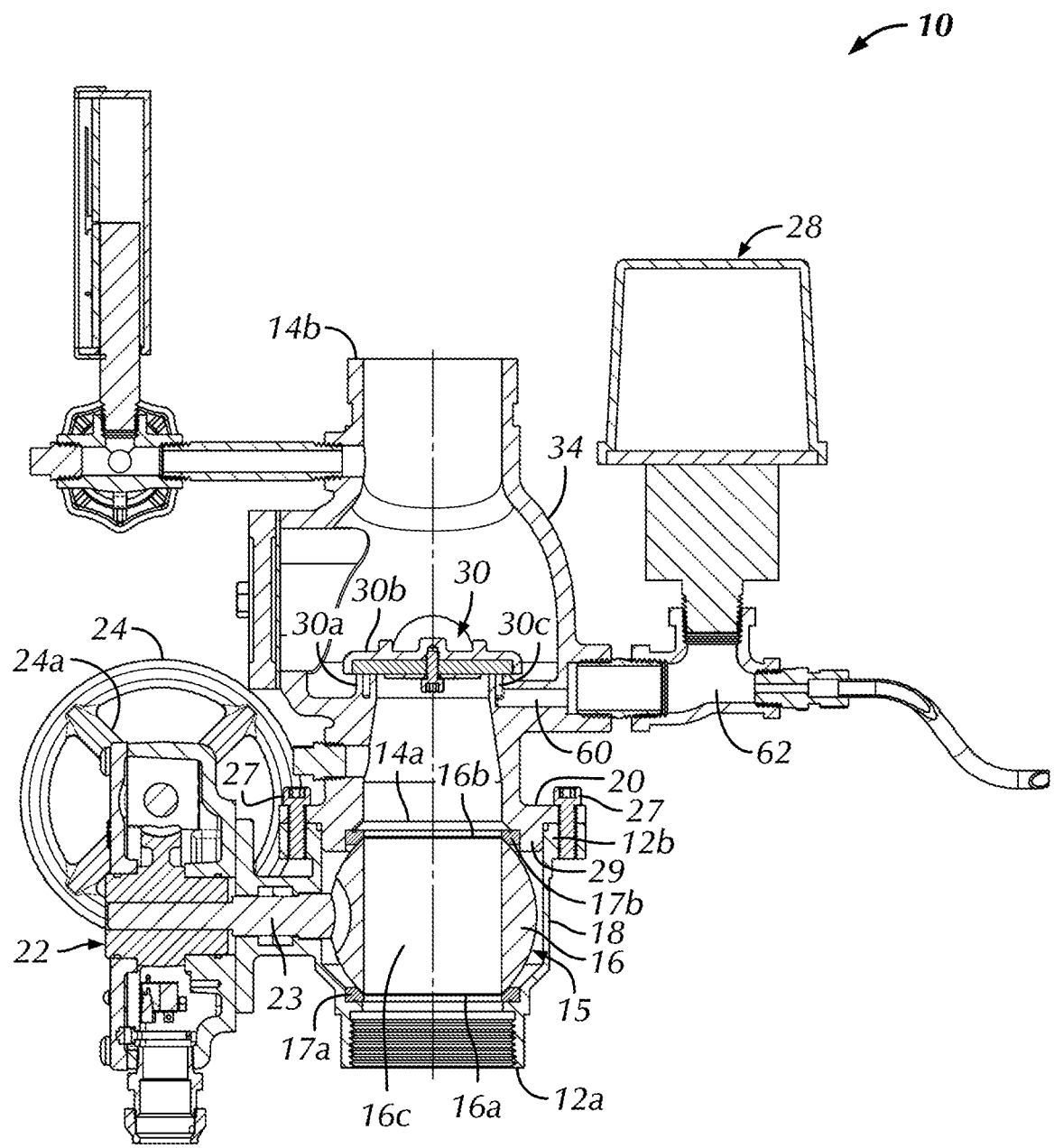
FIG. 4 is a cross-sectional view of the modular control valve assembly of FIG. 1, taken along the sectional line 4-4 of FIG. 2.

In the illustrated embodiment, and as shown best in FIGS. 3 and 4, the control assembly 12 includes a ball valve 15. The ball valve 15 includes a generally cylindrical (tubular) valve body 18 housing a perforated and rotating/pivoting ball 16 therein, having a sealing seat ring 17a, i.e., an endless, e.g., annular, valve seat underlying the ball 16 on an inlet side thereof and an opposing sealing seat ring 17b upon the ball 16 on an outlet side thereof. As should be understood, the seat rings 17a, 17b may be formed of metal(s), polymer(s), combinations thereof, or the like. As also should be understood by those of ordinary skill in the art, the seat rings 17a, 17b are configured to seal off and substantially prevent fluid from flowing around the ball 16 between an upstream side and a downstream side thereof, thereby requiring fluid to travel through the ball 16 to in order to travel between the upstream side and the downstream side thereof. The ball 16 includes an inlet opening 16a and an opposing outlet opening 16b, and a channel 16c, e.g., a bored out channel, extending therebetween. As should be understood by those of ordinary skill in the art, the ball valve 15 is a quarter-turn valve which is open (FIGS. 3, 4) when the channel 16c is in line with the water flow from the inlet 12a to the outlet 12b of the control assembly 12 and closed (see, e.g., FIG. 9A) when the ball 16 is rotated substantially 90° about an axis across the diameter of the valve body 18, i.e., the channel 16c is perpendicular to the direction of fluid flow. The valve 15 substantially prevents fluid flow through the valve body 18 in the closed position and permits fluid flow through the valve body 18 in the open position. The valve body 18 defines the inlet end 12a at one end thereof and an opposing outlet end 12b at the other end thereof, which is in fluid communication with an inlet end 14a of the check valve assembly 14.

A valve actuation assembly 22 for selectively orienting (rotating) the ball valve 15 between the open and closed configurations thereof (irrespective of a pressure differential across the ball valve 15) includes a transmission 19 (shown schematically in FIGS. 1, 2), e.g., a conventional, commercially available, worm gear transmission, in a housing 21 with a control arm 25 rotatable by a hand wheel 24 connected thereto. A stem 23 is attached (in a rotatably fixed manner) with the ball 16 of the valve 15 at one end thereof and extends through the valve body 18 into operative connection with the transmission 19 at the other end thereof.

Clockwise and counterclockwise rotation of the hand wheel 24 pivots the ball 16 between the open and closed positions thereof in a manner well understood by those of ordinary skill in the art, corresponding to open and closed configurations of the CVA 10, respectively. Namely, selective rotation of the hand wheel 24 rotates the control arm 25, which, in turn, rotates the stem 23 via the transmission 19, thereby rotating the ball 16 of the valve 15 between the open and closed configurations. Optionally, the transmission 19 may also provide a reduction ratio in a manner well understood by those of ordinary skill in the art. As should be understood, a reduction ratio provides a mechanical advantage to manually open and close the control assembly 12 under the operating pressure thereof.

To manually shut-off the CVA 10, e.g., for maintenance purposes or to turn off sprinklers after a fire event is extinguished, a user rotates the hand wheel 24 to rotate the ball 16 into the closed position thereof. To return the CVA 10 into the normal operating condition thereof (FIGS. 3, 4), the user rotates the hand wheel 24 in the opposite direction to rotate the ball 16 back to the open position thereof.

The control assembly 12 may also be provided in a conventional fashion with one or more internal supervisory switches, i.e., a tamper evident switch, which operate(s) in a manner well understood by those of ordinary skill in the art, and which is operatively connected to the control assembly 12 in a conventional manner. As one example, without limitation, the supervisory/tamper switch can be actuated by a cam (not shown), within the valve actuation assembly 22, operatively connected to a valve stem (not shown) of the control assembly 12 in a conventional fashion so as to change the state of the switch within a predetermined number of turns of the hand wheel 24. The supervisory switch is also connected in a manner well understood by those of ordinary skill in the art to a monitoring system (not shown), which produces a warning signal to energize an alarm, turn on a light, or the like in the event an unauthorized person starts to open or close the control assembly 12 of the CVA 10.

Turning to the check valve assembly 14, the assembly 14 defines a generally tubular, single piece, e.g., integral, unitary and monolithic, check valve body 34. A bottom end 20 of the valve body 34 (according to the orientation of the CVA 10 depicted in the Figs), defining the inlet 14a, operates as a bonnet for the valve body 18 of the ball valve 15. The bonnet 20 of the valve body 34 is fastened to the outlet 12b of the valve body 18 and acts as a cover portion of the valve body 18. In the illustrated embodiment, the bonnet 20 and the outlet 12b of the valve body 18 are fastened together via fastening bolts/nuts 27, but the disclosure is not so limited. As should be understood, other fastening means capable of attaching and detaching the control assembly 12 with the check valve assembly 14 may be utilized. The outlet 12b of the valve body 18 is dimensioned to receive the internal components of the ball valve 15, e.g., the ball 16 and the seat rings 17a and 17b, therethrough. During manufacture, for example, the components of the ball valve 15 are inserted into the valve body 18 via the outlet 12b, and, thereafter, the bonnet 20 of the check valve assembly 14 is fastened to the control assembly 12.

As shown in FIGS. 3 and 4, the bonnet 20 includes a downwardly projecting annular lip dimensioned to mate with the outlet 12b of the valve body 18 in a male-female relationship, and engage the seat ring 17b to sealingly hold the seat ring 17b against the ball 16 and against the lower seat ring 17a. One advantage of the bonnet 20 (for the valve body 18) being integrated into the valve body 34 is an overall reduction in the size of the CVA 10. In one embodiment, the bonnet 20 enables the CVA 10 to be within approximately 8 inches and approximately 10 inches in total length from the inlet 12a of the CVA 10 to the outlet 14b of the CVA 10, but the disclosure is not so limited.

The valve body 34 of the check valve assembly 14 houses a check valve 30. In the illustrated embodiment, the check valve 30 takes the form of a clapper valve. As should be understood by those of ordinary skill in the art, however, the check valve 30 is not limited to a clapper valve, and may take the form of other one-way valves substantially preventing backflow of liquid, currently known or that later become known, capable of performing the functions of the check valve 30 described herein. For example, without limitation, the check valve 30 may take the form of a wafer valve, a butterfly valve, a valve having a generally disk-shaped closure pivotable about an axis along a cross-section of a pipe to regulate direction of fluid flow, or the like.

The check valve 30 is positioned within the valve body 34, and includes an endless, e.g., annular, valve seat 30a and a removable clapper disk 30b which is pivotable between and open position (see, e.g., FIGS. 6, 8) and a closed position (FIGS. 3, 4) according to the water pressure differential across the clapper disk 30b. In the closed position of the check valve 30, the clapper disk 30b sealingly engages the valve seat 30a to prevent fluid from flowing through the check valve 30 from the outlet side 14b to the inlet side 14a, and in the open position of the check valve 30, the clapper disk 30b is pivoted upwardly away from the valve seat 30a and water is permitted to flow through the check valve 30 from the inlet side 14a to the outlet side 14b. A biasing member (not shown), e.g., a torsion spring, may be pivotably mounted to the inside of the valve body 34 and attached to the clapper disk 30b. The biasing member exerts a predetermined spring force on the clapper disk 30b to maintain the clapper disk 30b in sealed engagement with the valve seat 30a. The biasing force of the biasing member may be overcome by a pressure differential across the clapper disk 30b that results in a force against the clapper disk 30b that is greater than the biasing force and opposite in direction. As should be understood by those of ordinary skill in the art, the clapper disk 30b may alternatively be maintained in sealed engagement with the valve seat 30a via the force of gravity or other biasing members currently known or that later become known, capable of performing the function of the biasing member described herein.

As should be understood by those of ordinary skill in the art, because the CVA 10 is fluidly connected to a wet standpipe, the valve body 34 is filled with water and pressurized at all times. Water pressure differential across the valve 30 also maintains the clapper disk 30b in the closed position, i.e., water pressure is greater on the downstream side than the upstream side. When the sprinkler system is activated by a thermal event, e.g., a fire, a decrease in the water pressure on the downstream side of the valve 30, resulting from spraying of the sprinklers, causes a pressure differential across the clapper disk 30b that equates to a force greater than the spring force of the spring 30c, and, therefore, pivots the clapper disk 30b to the open position for water to flow through the valve 30 and to the sprinklers.

In the illustrated embodiment, an opening (not shown) is provided in the sidewall of the valve body 34, proximate the location of the check valve 30. The opening is sized and dimensioned to receive the check valve 30 therethrough during assembly of the check valve 30 within the valve body 34 (e.g., during manufacturing of the CVA 10). After the check valve 30 is mounted within the valve body 34, a removable cover plate 55 is sealingly fastened to the valve body 34 in a manner well understood by those of ordinary skill in the art to cover the opening. As should be understood by those of ordinary skill in the art, however, the valve body 34 may alternatively be constructed without the sidewall opening and the corresponding cover plate 55, and the check valve 30 can be assembled within the valve body via other openings, such as, for example, without limitation, via the inlet or outlet ends 14a, 14b of the valve body 34.

In the illustrated embodiment, a flow detection switch 28 is removably fluidly connected with the valve body 34, but the disclosure is not so limited. That is, the check valve body 34 may not include a flow detection switch 28 removably connected thereto and also may not include a port for connecting a flow detection switch 28 thereto. The flow detection switch 28 detects water flow from the inlet 12a to the outlet 14b of the CVA 10, and outputs a notification, e.g., sounding an audible alarm and/or changing the state of a visual indicator. In the illustrated non-limiting embodiment, the flow detection switch 28 is a pressure-actuated switch (known by those of ordinary skill in the art). The pressure-actuated switch 28 and a pressure responsive actuator (not shown) are connected in fluid communication with the check valve 30 when the clapper disk 30b is in the open position. As should be understood, the pressure-actuated switch 28 is actuated by a toggle arm, a spring loaded plunger or the like (not shown) which contacts an electric switch (not shown) which is connected with an alarm system (not shown). The actuator (not shown) includes a piston that is in engagement with the toggle arm to move the toggle arm.

As shown best in FIG. 4, a flow tube 62 of the actuator is connected with a channel 60 extending through a sidewall of the valve body 34. The endless valve seat 30a of the check valve 30 includes one or a plurality of angularly spaced apertures (or an endless channel) 30c therein, in fluid communication with the channel 60. The apertures 30c are formed such that an inlet side thereof is located on the surface of the valve seat 30a engageable by the clapper disk 30b. Therefore, when the clapper disk 30b is in the closed position (FIGS. 3, 4), the apertures 30c are sealed off from the water by the clapper disk 30b. Conversely, when the clapper disk 30b is moved to the open position, water flowing from the inlet side 14a to the outlet side 14b and exiting to the sprinklers also flows into the apertures 30c, through the channel 60 and into the flow tube 62. The water pressure in the flow tube 62 moves the piston of the actuator to move the toggle arm and activate the switch and generate an alarm.

In some embodiments, the electric switch may include an adjustable time delay (not shown), which is set to a predetermined period of time during which the electric switch must remain in the activated state prior to generating an alarm, indicating that either the sprinklers are activated or that the test, drain and adjustable pressure relief module 32 is draining water out of the CVA 10. The time delay accounts for pressure surges in the standpipe, which may sporadically and temporarily open the clapper disk 30b without the sprinklers actually being activated.

As should be understood by those of ordinary skill in the art, the flow detection switch 28 is not limited to a pressure-actuated flow detection switch. For example, without limitation, the flow detection switch 28 may take the form of a magnetically-actuated flow detection switch (not shown), a mechanically independent lever-style flow detection switch (not shown), i.e., not mechanically coupled or linked to any valve within the CVA 10, and the like.

In the illustrated embodiment, a test, drain and adjustable pressure relief module 32 is also removably fluidly connected with the valve body 34, but the disclosure is not so limited. That is, the check valve body 34 may not include a test, drain and adjustable pressure relief module 32 removably connected thereto and also may not include a port for connecting a test, drain and adjustable pressure relief module 32 thereto. Turning to the test, drain and adjustable pressure relief module 32, the test, drain and adjustable pressure relief features are combined into a single unit, fluidly connected with the valve body 34 of the check valve assembly 14 downstream of the check valve 30 and upstream of the outlet 14b of the CVA 10. The module 32 includes three fluidly connectable ports 42, 44, 46 and an internal flow valve 40, which directs the flow between the three ports. In the illustrated embodiment, the valve 40 takes the form of a ball valve (FIG. 3), but is not so limited. As should be understood by those of ordinary skill in the art, the valve 40 may take the form of any valve currently known, or that later becomes known, capable of performing the functions of the valve 40 described herein, such as, for example, without limitation, a spool valve.

The first port 42 of the module 32 is fluidly connected at an inlet side thereof to the check valve assembly 14 downstream from the check valve 30, and operates as the inlet port for the module 32. An outlet of the second port 44 is fluidly connected via external piping 50 with the third port 46 for pressure relief (as will be explained further below). The third port 46 fluidly connects the first port 42 with a drainage pipe (not shown), and operates as the exit port for the module 32. A lever 48 controls the internal flow valve 40.

When the lever 48 is oriented in the "test" position (i.e., with the indicator arrow of the lever 48 facing the "test" label in FIG. 1) (not shown), the internal ball valve 40 is oriented to be partially open or restricted between the first and third ports 42, 46. In one embodiment, the ball valve 40 includes a reduced size orifice adjacent the third port 46 and a larger sized orifice adjacent the first port 42. Therefore, water from the check valve assembly 14 and the sprinklers flows into the module 32 from the first port 42 and exits the module 32 in a restricted manner (via the reduced size orifice) through the third port 46. A transparent window 49 in the third port 46 allows a user to see whether water is flowing into the third port 46. As should be understood, the "test" position is utilized to simulate activation/operation of a single sprinkler and test whether activation of a single sprinkler will successfully, i.e., is sufficient to, trigger the flow detection switch 28 and generate the alarm. The "test"

position also confirms that water is present in the CVA 10 and sprinkler piping as required.

When the lever 48 is oriented in the "drain" position (i.e., with indicator arrow of the lever 48 facing the "drain" label in FIG. 1) (not shown), the internal ball valve 40 is oriented to be fully open between the first and third ports 42, 46, and fully closed to the second port 44. Accordingly, water drains out from the check valve assembly 14 and sprinklers and into the module 32 in a relatively unrestricted manner via the first port 42 and exits the module 32 through the third port 46. The drain position is utilized to drain water in the sprinkler piping on a respective floor, e.g., for maintenance.

During normal operation of the CVA 10, the lever is oriented in the "off" position" (FIG. 1). When the lever 48 is oriented in the "off" position (i.e., with the indicator arrow of the lever 48 facing the "off" label in FIG. 1), the internal ball valve 40 is oriented to be fully open between the first port 42 and the second port 44, and fully closed to the third port 46. An adjustable pressure relief valve 45 (well understood by those of ordinary skill in the art) is connected between the second port 44 and the piping 50.

The adjustable pressure relief valve 45 is generally set to a threshold pressure of approximately 175 psi under normal operation, i.e., 175 psi of water pressure on the inlet side of the pressure relief valve 45 is required to open the valve. Therefore, if during normal operation of the CVA 10 the water pressure therein exceeds 175 psi, the adjustable pressure relief valve 45 is opened and water flows from the check valve assembly 14, through the first port 46, through the adjustable pressure relief valve 45 in the second port 44, and is diverted through external piping 50 to the third port 46 to be drained. The purpose of the adjustable pressure relief valve 45 is to maintain appropriate water pressure at the top floors of a building without over pressurizing the bottom floors of the building. As should be understood, the adjustable pressure relief valve 45 may be adjusted to other normal operating pressure limits according to the requirements of a particular system. The adjustable pressure relief valve 45 may also be selectively adjusted for other applications, such as, for example, to conduct a system pressure test.

As should be understood by those of ordinary skill in the art, the test, drain and adjustable pressure relief valves may alternatively be separately and removably attached to the CVA 10. Yet further, one or more of the test, drain and adjustable pressure relief valves may be separately attached to the piping system network, upstream or downstream of the CVA 10 in a conventional manner.

FIGS. 5-8 illustrate a second embodiment of the CVA 110. The reference numerals of the present embodiment are distinguishable from those of the above-described embodiment by a factor of one-hundred (100), but otherwise indicate the same elements as indicated above, except as otherwise specified. The CVA 110 of the present embodiment is similar to that of the earlier embodiment. Therefore, the description of certain similarities between the embodiments may be omitted herein for the sake of brevity and convenience, and, therefore, is not limiting.

A primary difference between the CVA's 10 and 110 is that the check valve 130 is positioned within the ball valve 115, forming a combined check and control valve, thereby eliminating the check valve assembly 14 and further reducing the size/footprint of the CVA 110 relative to the CVA 10.

Figure 5:
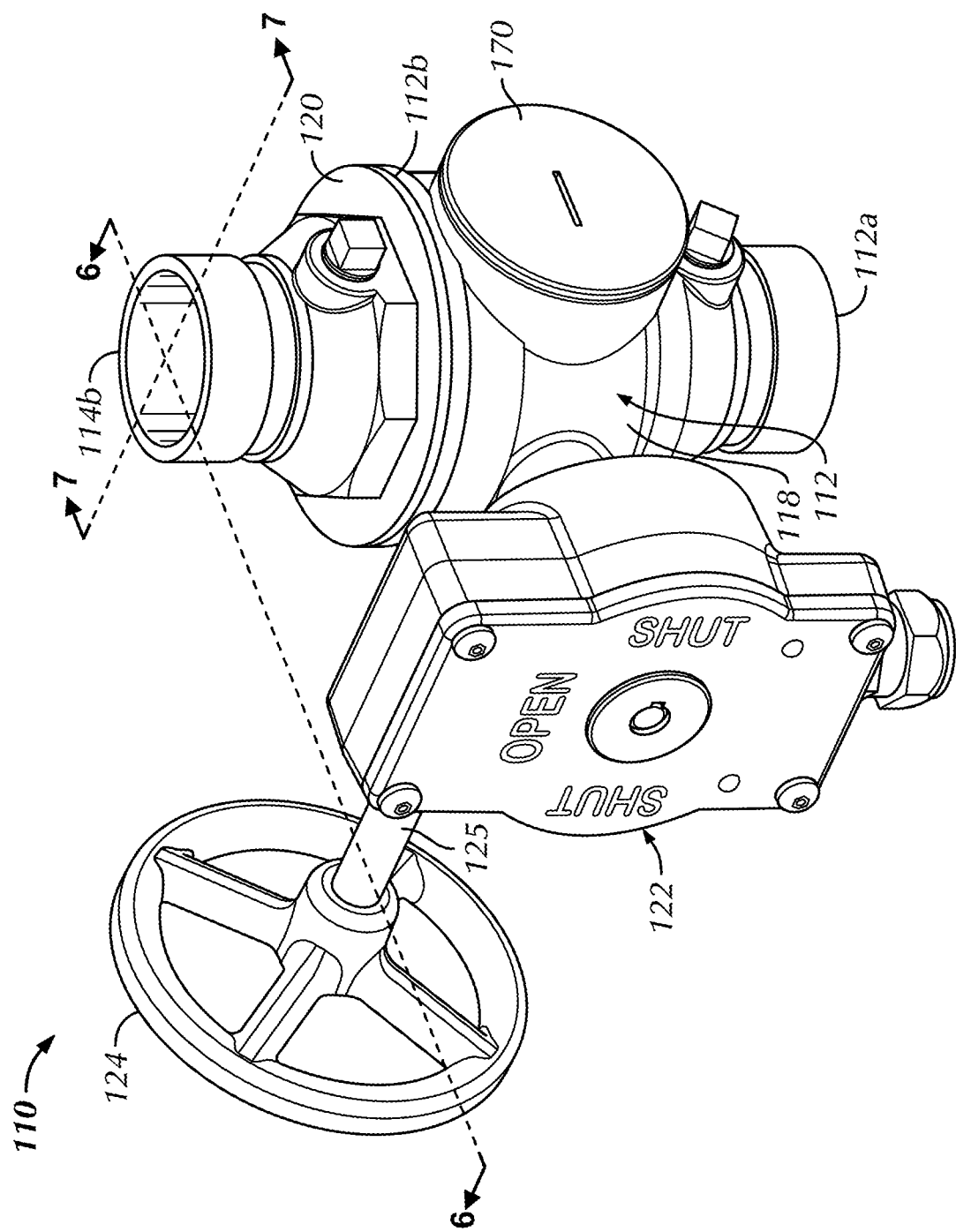
FIG. 5 is a perspective front and side view of a control valve assembly according to a second embodiment of the present invention.

As shown best in FIG. 5, the control assembly 112 includes a generally cylindrical valve body 118 and a valve body bonnet 120 removably mounted to the top of the valve body 118. In the illustrated embodiment, the bonnet 120 is threadably connected to the outlet 112b of the valve body 118, but the disclosure is not so limited. As should be understood, other fastening means capable of attaching and detaching the bonnet 120 with the valve body 118 may be utilized, such as, for example, without limitation, fastening bolts/nuts.

The valve body 118 defines the main inlet 112a of the CVA and the bonnet 120 defines the main outlet 114b of the CVA 110. Similarly to the valve body 18 of CVA 10, the outlet 112b of the valve body 118 is dimensioned to receive the internal components of the ball valve 115, e.g., the ball 116 and the seat rings 117a and 117b, therethrough. During manufacture, for example, the components of the ball valve 115 are inserted into the valve body 118 via the outlet 112b, and, thereafter, the bonnet 120 is fastened to the valve body 118.

Figure 6:
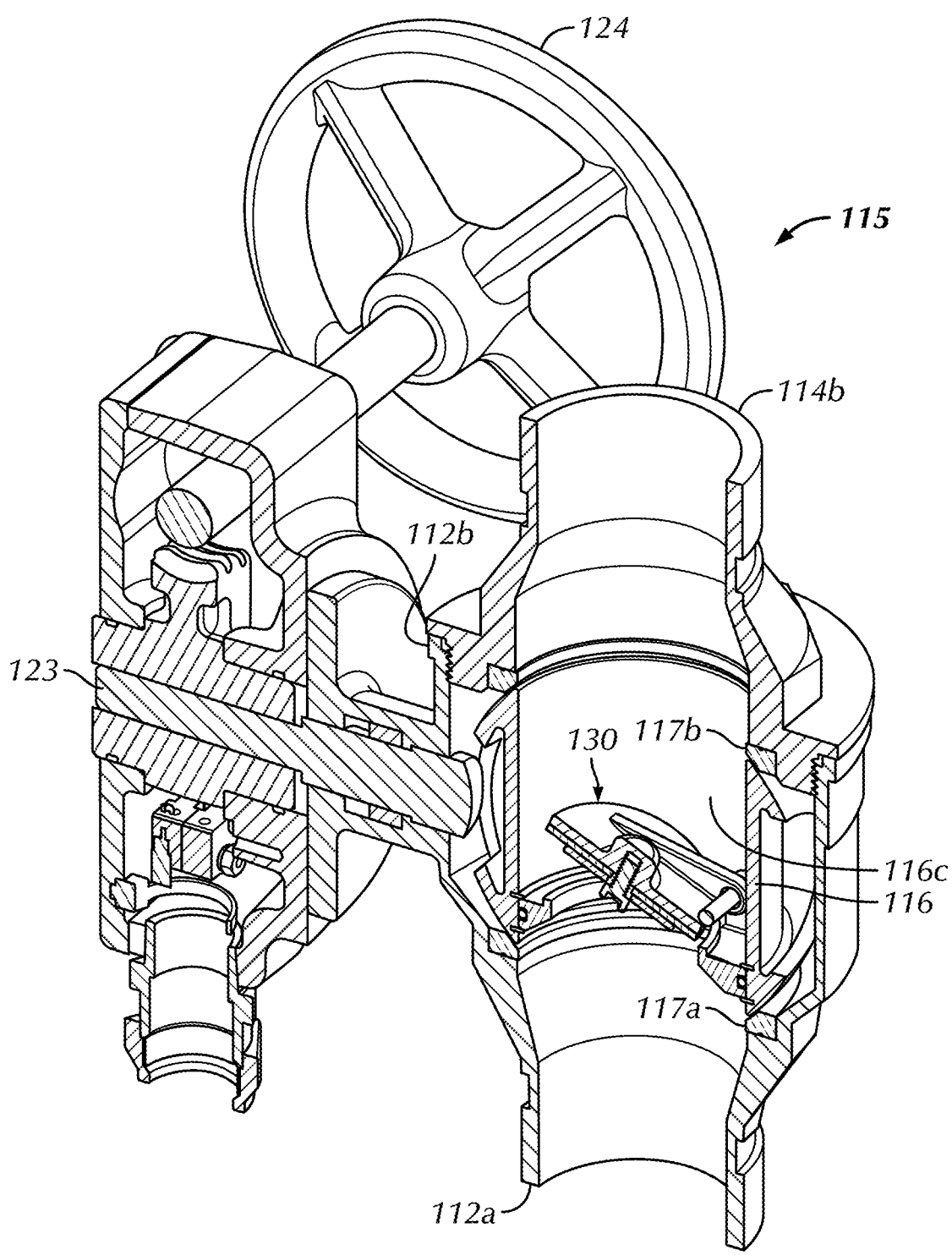
FIG. 6 is a cross-sectional view of the control valve assembly of FIG. 5, taken along the sections line 6-6 of FIG. 5.
Figure 7:
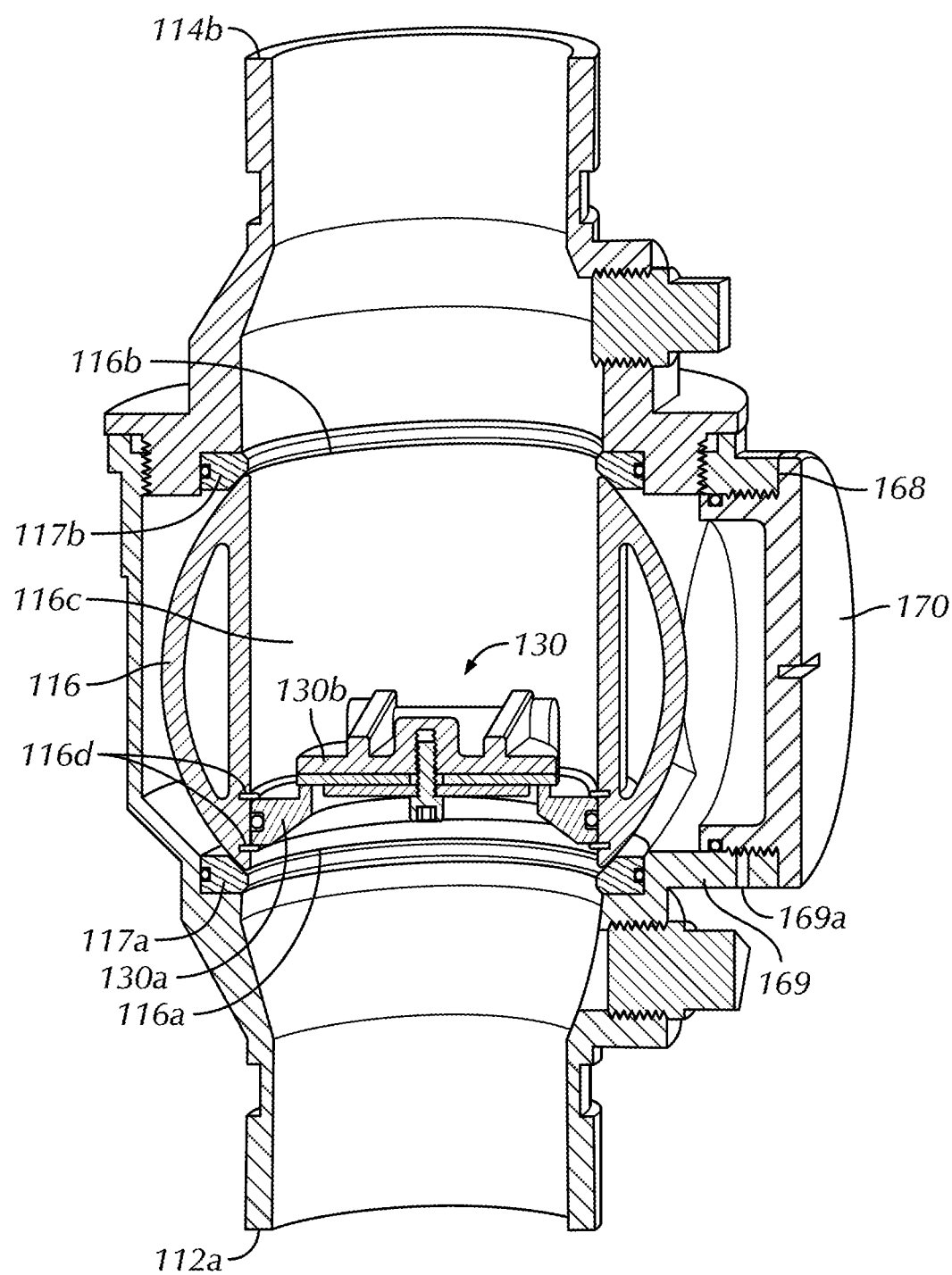
FIG. 7 is a cross-sectional view of the control valve assembly of FIG. 5, taken along the sections line 7-7 of Fig.

Turning to the ball valve 115 shown best in FIGS. 6 and 7, the ball valve 115 includes the valve body 118 housing the pivoting ball 116 and the seat rings 117a, 117b. The ball 116 includes the inlet opening 116a and an opposing outlet opening 116b, and a channel 116c, e.g., a bored out channel, extending therebetween. The ball 116 includes a check valve 130 mounted in the channel 116c. In the illustrated embodiment of FIGS. 5-8, the entirety of the check valve 130 is removably mounted in the channel 116c, but the disclosure is not so limited (as described further below). In the illustrated embodiment, the check valve 130 takes the form of a clapper valve. As should be understood by those of ordinary skill in the art, however, the check valve 130 is not limited to a clapper valve, and may take the form of other one-way valves substantially preventing backflow of liquid, currently known or that later become known, capable of performing the functions of the check valve 130 described herein. For example, without limitation, the check valve 130 may take the form of a wafer valve, a butterfly valve, a valve having a generally disk-shaped closure pivotable about an axis along a cross-section of a pipe to regulate fluid flow, or the like.

Figure 8:
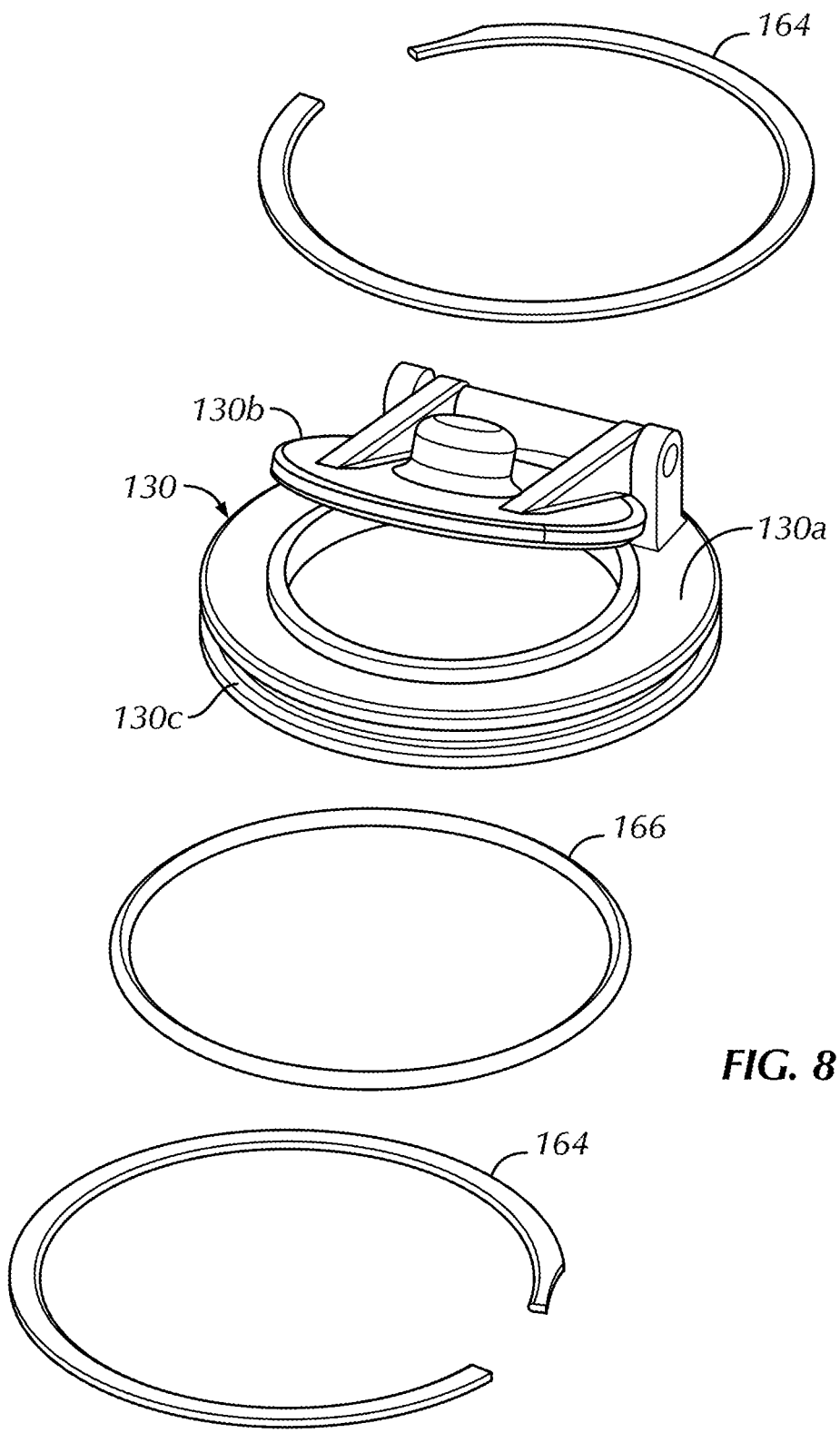
FIG. 8 is an exploded view of a check valve integrated into a control valve of the modular control valve assembly of FIG. 5.

As shown best in FIG. 8, the check valve 130 includes an endless, e.g., annular, valve seat 130a and a removable clapper disk 130b which is pivotable between open (FIG. 6) and closed (see, e.g., FIGS. 7, 9A) positions (as should be understood by those of ordinary skill in the art, and previously explained with respect to the CVA 10). In the illustrated embodiment, the channel 116c of the ball 116 includes a pair of parallel and spaced apart annular (circumferential) grooves 116d in the sidewall thereof. The valve seat 130a is positioned between the grooves 116d with a spring retainer ring 164 (FIG. 8) installed in each of the grooves 116d, i.e., above and below the valve seat 130a, to removably stabilize the valve seat 130a in place therebetween. As shown best in FIG. 8, the annular valve seat 130a includes an annular groove 130c in the sidewall thereof and an annular seal 166, e.g., an o-ring or the like, is received therein, for sealingly engaging with the sidewall of the bored channel 116c of the ball 116. As should be understood by those of ordinary skill in the art, however, the check valve 130 may be removably installed in the bored channel 116c of the ball 116 via other means currently known or that later become know.

Optionally, at least some components of the ball valve 115 and the check valve 130 are both coated with a corrosion resistant coating, such as, for example, without limitation, a chrome coating. In one embodiment, for example, the ball 116 and the clapper disk 130b are coated with a corrosion resistant coating. In another embodiment, the valve seat 130a is also coated with a corrosion resistant coating.

In operation, and as shown best in FIGS. 6 and 7, the channel 116c is in line with fluid flow when the ball control valve 115 is in the open position thereof. The check valve 130 is oriented substantially perpendicularly to the direction of fluid flow when the ball control valve 115 is in the open position thereof. Accordingly, when the ball valve 115 is in the open position thereof, the check valve 130 operates in a normal manner. That is, water pressure differential across the valve 130 maintains the clapper disk 130b in the closed position, i.e., water pressure is greater on the downstream (sprinkler) side than the upstream (water supply) side. When the sprinkler system is activated by a thermal event, e.g., a fire, a decrease in the water pressure on the downstream side of the valve 130, resulting from spraying of the sprinkler heads, causes a pressure differential across the clapper disk 130b that pivots the clapper disk 130b to the open position for water to flow through the check valve 130 and to the sprinkler heads. To manually shut-off the CVA 110 (in the same manner as previously described with respect to the CVA 10), e.g., for maintenance purposes or to turn off sprinklers after a fire event is extinguished, a user rotates the hand wheel 124 to rotate the ball 116 into the closed position thereof.

As shown in FIGS. 5-7, a side opening 168 is provided in the sidewall of the valve body 118, adjacent the ball 116. In the illustrated embodiment, the side opening 168 defines an open end of a throat 169 extending from the generally tubular sidewall of the valve body 118, but the disclosure is not so limited. The side opening 168 is sized and dimensioned to permit passing of the check valve 130 therethrough. The side opening 168 is positioned to align with the channel 116c of the ball 116 when the ball valve 115 is oriented in the closed position, thereby facing the check valve 130. That is, when the ball valve 115 is rotated substantially 90° from the open position thereof, into the closed position, the bored channel 116c thereof aligns with the side opening 168. A removable side cover 170 sealingly closes the side opening 168 in a manner well understood by those of ordinary skill in the art, such as, for example, without limitation, via a threaded engagement with the throat 169 in the illustrated embodiment.

Advantageously, the side opening 168 permits access to the check valve 130 when the ball valve 115 is in the closed position. Accordingly, inspection and/or maintenance of the check valve 130 is greatly simplified. For example, when the ball valve 115 is moved into the closed position, the side cover 170 may be removed to access the check valve 130. Should the check valve 130 (or any component thereof) require replacement, one of the spring retainer rings 164 is removed, permitting removal and replacement of the check valve 130 (or the components thereof) through the side opening 168, and then a spring retainer ring 164 is re-installed. Alternatively, the check valve 130 may be removed and not replaced, for use of the ball valve 115 by itself. Because the ball valve 115 is in the closed position, water flow is stopped during such maintenance and the check valve 130 is substantially isolated from the water on both the upstream and the downstream side of the check valve 130. Advantageously, therefore, the need to drain the entire system prior to conducting inspection and/or maintenance of the check valve 130 is eliminated.

Further advantageously, and as shown best in FIG. 5, the side opening 168 of the valve body 118 is angularly spaced from the valve actuation assembly 122 along the sidewall of the valve body 118 sidewall. As one example, if the valve actuation assembly 122 is mounted to the valve body 118 on a side identified as the "front" or "back" side of the valve body 118, i.e., the stem 123 extends through the valve body 118 into engagement with the ball 116 through the "front" or "back" side of the valve body 118, respectively, then the side opening 168 may be formed in a side of the valve body 118 identified as the "left" or "right" side, i.e., angularly spaced approximately 90° from the "front" or "back" side of the valve body 118 Therefore, access to the ball 116 through the side opening 168 does not interfere with operation of the valve actuation assembly 122. Advantageously, therefore, stabilization of the ball 116 by the valve actuation assembly 122 is unaffected while accessing the check valve 130 through the side opening 168, thereby minimizing risk of injury to a technician that may otherwise arise due to movement of the ball 116 under pressure in the water flow line.

In the illustrated embodiment, the throat 169 includes a water pressure relief opening 169a bored in a sidewall of the throat 169 at a position covered by the side cover 170 when the side cover 170 is sealingly fastened to the throat 169. Accordingly, when the side cover 170 is sealingly mounted to close the opening 168, the pressure relief opening 169a is also closed and does not relieve any pressure. Conversely, when the ball valve 115 is rotated into the closed position thereof and the side cover 170 is removed to access the channel 116c and the check valve 130, residual pressurized water within the channel 116c is released via the opening 169a as the side cover 170 is removed, and before complete removal of the side cover 170. The opening 169a, therefore, functions as a safety pressure relief, preventing residual pressurized water within the channel 116c from applying a pressure relief induced force onto the side cover 170 while being removed by a user, which may otherwise cause injury to the user, e.g., via collision of the side cover 170 with the user.

Figure 9A:
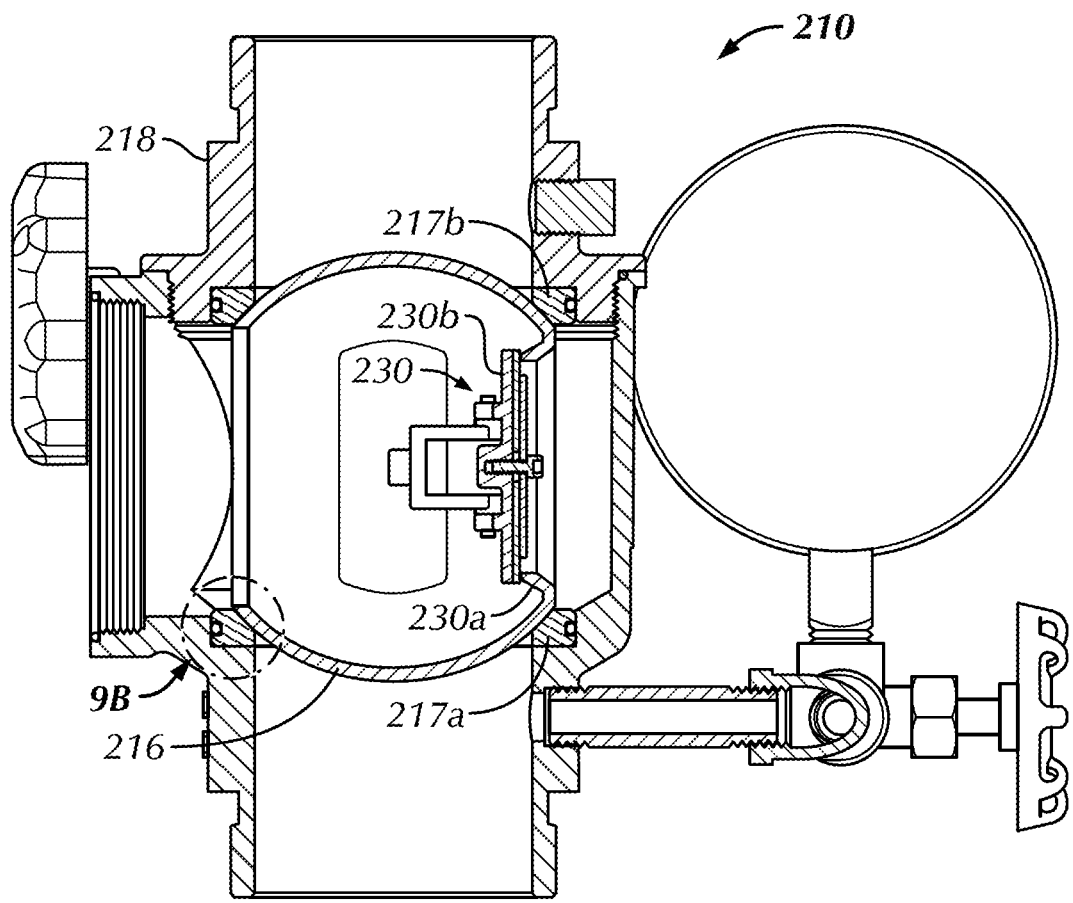
FIG. 9A is cross-sectional view of a control valve assembly according to a third embodiment of the present invention.
Figure 9B:
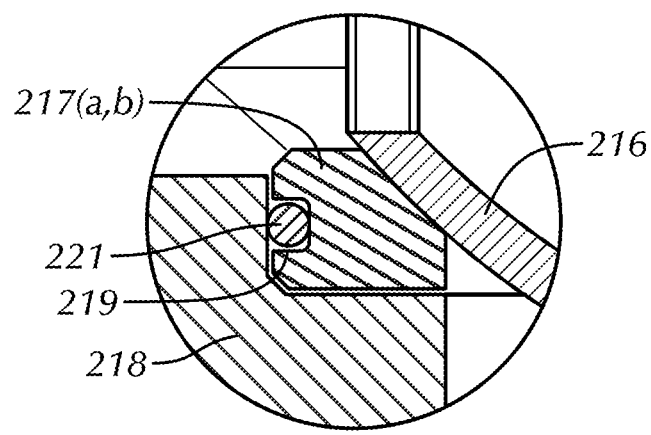
FIG. 9B is an enlarged partial cross-sectional view of a seat ring of the control valve assembly of FIG. 9A.

FIGS. 9A-9B illustrate a third embodiment of the CVA 210. The reference numerals of the present embodiment are distinguishable from those of the above-described second embodiment by a factor of one-hundred (100), but otherwise indicate the same elements as indicated above, except as otherwise specified. The CVA 210 of the present embodiment is similar to that of the embodiment of FIGS. 5-8. Therefore, the description of certain similarities between the embodiments may be omitted herein for the sake of brevity and convenience, and, therefore, is not limiting.

A primary difference between the CVAs 110 and 210 is that the valve seat 230a is integrally formed, i.e., monolithic, within the ball 216. As shown best in FIG. 9A, the valve seat 230a projects radially inwardly from the interior sidewall of the ball 216, i.e., forming an annular lip for receiving the clapper disk 230b thereon in the closed position of the check valve 230. As should be understood, the clapper disk 230b remains removably, pivotably attached within the ball 216 to permit removal and replacement thereof if necessary. As shown best in FIG. 9A, the ball 216 takes the form of a substantially hollowed out ball 216, rather than having a bored out channel therein, but the disclosure is not so limited.

As should be understood by those of ordinary skill in the art, the ball 216 is positioned in the fluid flow path within the valve body 218. Accordingly, the ball 216 is exposed to water pressure on both the upstream side thereof and the downstream side thereof, and, therefore, subject to pressure differential across the ball 216. When the water pressure is greater on the upstream side of the ball 216 than the downstream side thereof, for example, the pressure presses the ball 216 against the downstream seat ring 217b, i.e., the seat ring on the lower pressure side of the ball 216. Conversely, when the water pressure is greater on the downstream side of the ball 216 than the upstream side thereof, the pressure presses the ball 216 against the upstream seat ring 217a (the lower pressure side). The seat ring that is compressed by the ball 216 (against the inner sidewall of a valve body 218) according to the water pressure differential is "activated" by the compression, i.e., provides proper sealing with the opposing inner sidewall of the valve body 218 to substantially prevent water leakage therebetween. Conversely, the seat ring on the higher pressure side of the ball 216 may not be sufficiently "activated" without adequate compression of the ball 216 thereon.

To provide additional compression at both seat rings 217 (a, b), the seat rings 217 (a, b) each take the form of a reciprocating, piston style dynamic seat ring (shown best in FIG. 9B). The following description of a seat ring 217 pertains to each of the seat rings 217a, 217b. The seat ring(s) 217 includes an annular groove 219 in the peripheral sidewall thereof, and a compressible/deformable O-ring 221 received in the groove 219 and at least partially compressed between the groove 219 and the opposing inner sidewall of the valve body 218. The seat ring 217 also defines a diametrical clearance from the opposing inner sidewall of the valve body 218 to enable axial seat ring 217 reciprocation according to differential pressure. The diametrical clearance of the seat ring 217 from the opposing inner side sidewall of the valve body 218 (i.e., the seat ring 217 diameter), in combination with the annular groove 219 diameter, height and depth, and the O-ring 221 durometer, thickness/cross-section and inside diameter are configured to enable the O-ring 221 to balance consistent partial compression of the O-ring 221 between the groove 219 and the opposing inner sidewall of the valve body 218 while also enabling axial reciprocation of the O-ring 221 (within the groove 219) and the corresponding seat ring 217 relative to one another. As should be understood, the diametrical clearance between the seat ring 217 and the opposing inner side sidewall of the valve body 218 is less than the thickness/cross-section of the O-ring 221.

As system pressure activates the seat ring 217, the differential pressure across the seat ring 217 axially reciprocates the O-ring 221 and the seat ring 217 relative to one another to: (i) press the seat ring 217 against the ball 216 and seal the surface therebetween, and (ii) axially translate the O-ring 221 within the groove 219 toward the lower pressure side of the groove 219 to further compress/deform the O-ring 221 to sufficiently fill and seal the diametrical clearance between the seat ring 217 and the opposing inner sidewall of the valve body 218. Advantageously, therefore, the seat ring 217 (a, b) on the higher pressure side of the ball 216 (i.e., that may not otherwise be sufficiently compressed by the ball 216 under the pressure differential across the ball 216) nevertheless provides active sealing as the pressure differential also acts on the O-ring 221 and the respective seat ring 217 to compress the O-ring 221 into proper sealing engagement between the seat ring 217 and the opposing inner sidewall of the valve body 218 and also press the seat ring 217 against the ball 216 to into proper sealing engagement with the ball 216. As should be understood, although the dynamic seat ring 217 is illustrated along with the embodiment of FIGS. 9A-9B, the dynamic seat 217 ring may be employed in any of the embodiments described herein.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention, as set forth in the appended claims.

We claim:

1. A combination control and check valve assembly for a wet piping system, the valve assembly comprising:
    a valve body defining an inlet of the valve assembly, an outlet and a valve body fluid flow pathway therebetween;
    a quarter-turn ball valve positioned within the valve body, the ball valve comprising a rotatable ball, an upstream sealing seat ring positioned on an inlet side of the ball and a downstream sealing seat ring positioned on a downstream side of the ball, the ball having an inlet opening, an outlet opening and a ball fluid flow pathway therebetween, and the upstream and downstream seat rings being configured to substantially seal off fluid flow between an upstream side and a downstream side of the ball except for travel through the ball fluid flow pathway;
    a valve actuation assembly configured to selectively rotate the ball substantially 90° between only two operative positions, a first operative position being an open position, fluidly connecting the ball fluid flow pathway with the valve body fluid flow pathway to permit fluid flow from the inlet to the outlet of the valve body through the ball, and a second operative position being a closed position, substantially fluidly disconnecting the ball fluid flow path from the valve body fluid flow path to substantially prevent fluid flow from the inlet to the outlet of the valve body, the valve actuation assembly including a stem extending from outside the valve body, through a first side thereof and into rotationally fixed attachment with the ball, whereby rotation of the stem rotates the ball between the open and closed positions thereof irrespective of a pressure differential across the ball;
    a one-way check valve mounted within the ball, the check valve comprising an endless valve seat and a pivotable clapper disk, the clapper-disk being movable according to a pressure differential across the check valve between a closed position, wherein the clapper disk is in sealed engagement with the endless valve seat, thereby blocking fluid flow through the ball fluid flow pathway, and an open position, wherein the clapper disk is spaced away from the endless valve seat, thereby permitting fluid flow through the ball fluid flow pathway in a direction from the inlet side to the outlet side thereof;
    a side opening formed in a second side of the valve body that is angularly spaced approximately 90° from the first side of the valve body, the side opening being positioned to align with and access the ball fluid flow pathway in the closed position of the ball, and the side opening being dimensioned to permit passage of the check valve therethrough; and
    a side cover removably closing the side opening.

2. The combination control and check valve assembly of claim 1, further comprising a bonnet removably mounted upon the valve body, the bonnet defining an outlet of the valve assembly.

3. The combination control and check valve assembly of claim 1, wherein the upstream and downstream seat rings are dynamic seat rings.

4. The combination control and check valve assembly of claim 3, wherein each seat ring includes an annular groove in a peripheral sidewall thereof and a compressible O-ring mounted in the groove, the O-ring being partially compressed between the groove and an opposing inner sidewall of the valve body, the O-ring and the groove being axially reciprocal relative to one another according to a differential pressure across the seat ring to axially translate one of the O-ring and the groove relative to the other of the O-ring and the groove and further compress the O-ring between the groove and the opposing inner sidewall of the valve body.

5. The combination control and check valve assembly of claim 1, wherein the clapper disk is removably mounted within the ball.

6. The combination control and check valve assembly of claim 5, wherein the valve seat is integrally formed within the ball.

7. The combination control and check valve assembly of claim 1, wherein the valve seat is removably mounted within the ball.

8. The combination control and check valve assembly of claim 1, wherein at least the ball is coated with a corrosion resistant coating.

9. The combination control and check valve assembly of claim 1, wherein the side opening includes an outwardly extending throat from the second side of the valve body, the side cover removably covering the throat, and a water pressure relief opening is formed in a sidewall of the throat, the pressure relief opening being formed at a position covered by the side cover when removably covering the throat.

10. The combination control and check valve assembly of claim 1, wherein the ball fluid flow pathway comprises a bored out channel extending through the ball from the inlet opening to the outlet opening.

* * * * *